US012615287B2

(12) United States Patent (10) Patent No.: US 12,615,287 B2
Simioni et al. (45) Date of Patent: Apr. 28, 2026

(54) SYSTEM FOR PROTECTING AGAINST PRYING IoT DEVICES

(71) Applicant: International Business Machines Corporation, Armonk, NY (US)

(72) Inventors: Marco Simioni, Dublin (IE); Stefano Braghin, Dublin (IE); Mark Purcell, Naas (IE); Killian Levacher, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 18/157,560

(22) Filed: Jan. 20, 2023

(65) Prior Publication Data

US 2024/0250984 A1 Jul. 25, 2024

(51) Int. Cl.
*H04L 29/06* (2006.01)
*H04L 9/40* (2022.01)

(52) U.S. Cl.
CPC ...... *H04L 63/1466* (2013.01); *H04L 63/0236* (2013.01)

(58) Field of Classification Search
None
See application file for complete search history.

(56) References Cited

U.S. PATENT DOCUMENTS

| | | | |
|---|---|---|---|
| 11,405,778 B2 | 8/2022 | Omsberg et al. | |
| 2016/0173693 A1* | 6/2016 | Spievak | H04M 3/5191 |
| | | | 379/265.09 |
| 2021/0075772 A1* | 3/2021 | Tew | H04R 29/004 |
| 2021/0266731 A1* | 8/2021 | Omsberg | G06Q 50/265 |

OTHER PUBLICATIONS

"Amazon—MAC address/vendor lookup and search—look up MAC address, identify MAC address, check MAC adress," accessed Nov. 14, 2022, 1 page. https://www.adminsub.net/mac-address-finder/amazon.
Orr, "Lawyers: Turn off Alexa and Google Home Before Confidential Meetings," The Mac Observer, Mar. 23, 2020, accessed Nov. 14, 2022, 1 pages. https://www.macobserver.com/link/lawyers-turn-off-alexa/.
Brownlee et al. "Traffic Flow Measurement: Architecture," The Internet Society, RFC, 2722, Oct. 1999, 48 pages. https://dl.acm.org/doi/10.17487/RFC2722.

(Continued)

*Primary Examiner* — Andrew J Steinle
(74) *Attorney, Agent, or Firm* — Anthony M. Pallone

(57) ABSTRACT

Protection against prying devices on a computer network is provided. The method comprises identifying a number of prying devices connected to the computer network, wherein the prying devices have the capability to record audio and/or video data, and wherein the prying devices have the potential to eavesdrop on an audio/video conference call. Responsive to detecting initiation of the audio/video conference call, the prying devices are prevented from communicating over the computer network. Responsive to detecting termination of the audio/video conference call, the prying devices are allowed to resume communication over the computer network.

20 Claims, 4 Drawing Sheets

(56) References Cited

OTHER PUBLICATIONS

Tse et al., "Locked-Down Lawyers Warned Alexa Is Hearing Confidential Calls, " Technology Cybersecurity, Mar. 20, 2020, Copyright Bloomberg L.P., accessed Nov. 29, 2022, 2 pages. https://www.bloomberg.com/news/articles/2020-03-20/locked-down-lawyers-warned-alexa-is-hearing-confidential-calls.

Ford et al., "Alexa, are you listening to me? An analysis of Alexa voice service network traffic," Personal and Ubiquitous Computing (2019), 23: 67-79, Springer-Verlag London Ltd., part of Springer Nature 2018, Jun. 28, 2018, 13 pages. https://doi.org/10.1007/s00779-018-1174-x.

Michaelson, "How Secure are Your Smart Devices? How to Keep Alexa (and Others) from Spilling Your Secrets!," Jan. 1, 2020, accessed Nov. 14, 2022, 2 pages. https://www.connect2geek.com/secure-smart-devices-alexa/.

Teague, "Protect Your Amazon Echo Privacy While Working From Home: 7 Simple Tricks," Feb. 26, 2022, accessed Nov. 14, 2022, 3 pages. https://www.cnet.com/home/smart-home/protect-your-amazon/.

Loh et al., "YouTube Dataset on Mobile Streaming for Internet Traffic Modeling and Streaming Analysis," Scientific Data, Jun. 13, 2022, 13 pages. https://doi.org/10.1038/s41597-022-01418-y.

Day et al., "Amazon Workers Are Listening to What You Tell Alexa," Technology, Apr. 10, 2019, accessed Nov. 29, 2022, 2 pages. https://www.bloomberg.com/news/articles/2019-04-10/is-anyone-listening-to-you-on-alexa-a-global-team-reviews-audio.

Ophtek LLC, "4 Real Life Examples of the IoT Being Hacked—Ophtek," Jan. 9, 2018, accessed Nov. 14, 2022, 2 pages. https://ophtek.com/4-real-life-examples-iot-hacked/.

Mitev et al., "LeakyPick: IoT Audio Spy Detector," ACSAC '20: Annual Computer Security Applications Conference, Dec. 2020, Submitted Nov. 12, 2020, 12 pages. https://doi.org/10.1145/3427228.3427277.

Galetto et al., "Detection of video/audio streaming packet flows for non-intrusive QoS/QoE monitoring," 2017 IEEE International Workshop on Measurement and Networking (M&N), Sep. 27-29, 2017, 6 pages.

Anonymous, "System and Methods to Handle and Automatically Detect Privacy-Undermining Home Devices," An IP.com Prior Art Database Technical Disclosure, IPCOM000270805D, Aug. 19, 2022, 5 pages.

Dunlap, "The 5 Worst Examples of IoT Hacking and Vulnerabilities in Recorded History," IoT For All, Jun. 20, 2020, accessed Nov. 14, 2022,3 pages. https://www.iotforall.com/5-worst-iot-hacking-vulnerabilities.

Liu et al., "Wavelet-Based Traffic Analysis for Identifying Video Streams over Broadband Networks," 2008 IEEE Global Telecommunications Conference (GLOBECOM2008), Nov. 30-Dec. 4, 2008, 6 pages.

* cited by examiner

COMPUTING ENVIRONMENT
100

SYSTEM FOR PROTECTING AGAINST PRYING IoT DEVICES

BACKGROUND

1. Field

The present disclosure relates generally to an improved computing system, and more specifically to network security to prevent eavesdropping by IoT devices.

2. Background

In the consumer market, internet of things (IoT) technology is most synonymous with products pertaining to the concept of the "smart home," including devices and appliances such as lighting fixtures, thermostats, home security systems and cameras, and other home appliances such as "always on" Smart Speaker devices. Video conferencing allows users in different locations to hold face-to-face meetings without having to be in the same location. The recent rapid shift from office work to working at home has increased the use of video conferencing, often in the presence of IoT devices.

SUMMARY

An illustrative embodiment provides a computer-implemented method for protecting against prying devices on a computer network. The method comprises identifying a number of prying devices connected to the computer network, wherein the prying devices have the capability to record audio and/or video data, and wherein the prying devices have the potential to eavesdrop on an audio/video conference call. Responsive to detecting initiation of the audio/video conference call, the prying devices are prevented from communicating over the computer network. Responsive to detecting termination of the audio/video conference call, the prying devices are allowed to resume communication over the computer network. According to other illustrative embodiments, a computer system, and a computer program product for predictive dead store elimination are provided.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
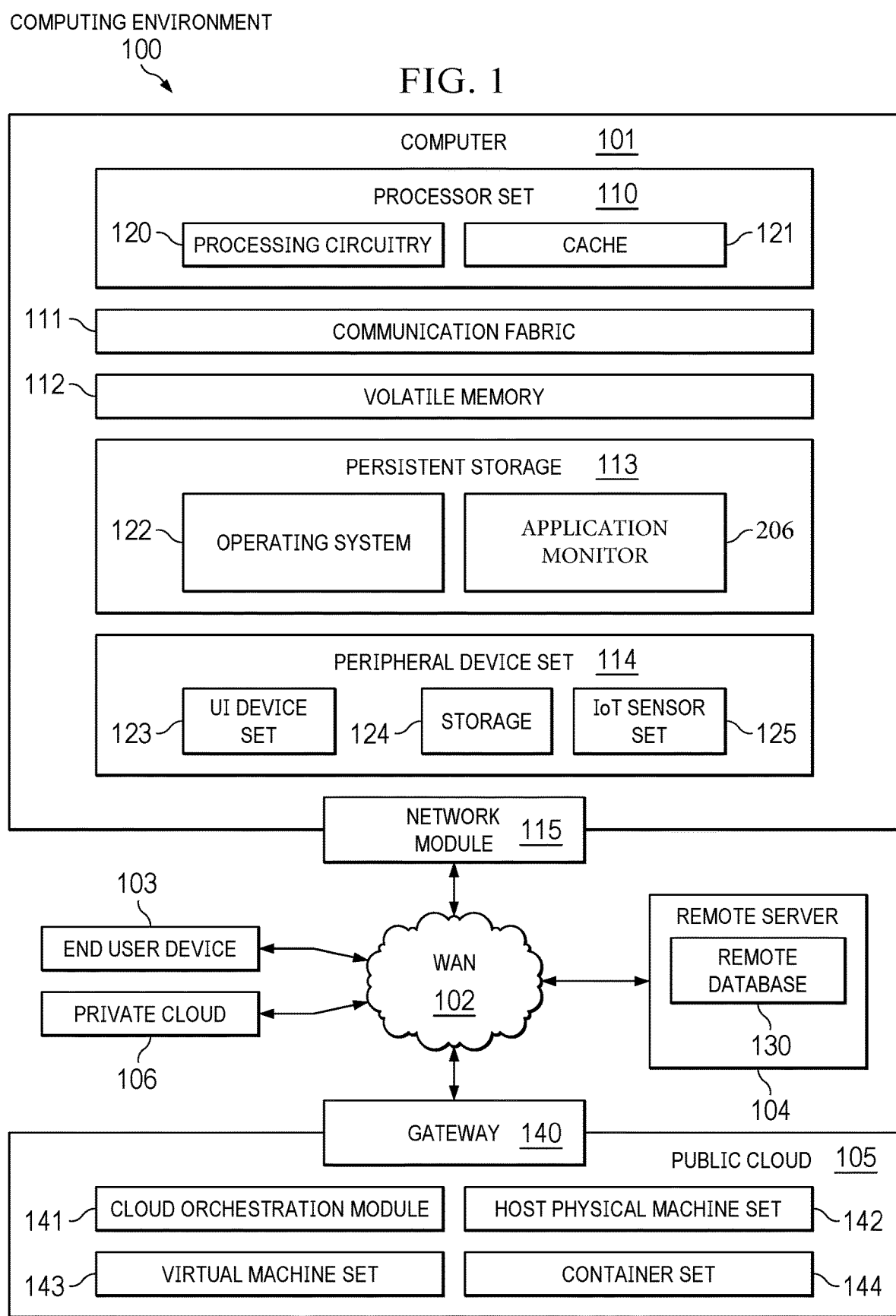
FIG. 1 depicts a pictorial representation of a computing environment in which illustrative embodiments may be implemented.

With reference now to the figures, and in particular, with reference to FIG. 1, a diagram of a data processing environment is provided in which illustrative embodiments may be implemented. It should be appreciated that FIG. 1 is only meant as an example and are not intended to assert or imply any limitation with regard to the environments in which different embodiments may be implemented. Many modifications to the depicted environment may be made.

FIG. 1 depicts a pictorial representation of a computing environment in which illustrative embodiments may be implemented. Computing environment 100 contains an example of an environment for the execution of at least some of the computer code involved in performing the inventive methods, such as application monitor 206. In addition to application monitor 206, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and application monitor 206, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in application monitor 206 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. Application monitor included in block 206 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102.

Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account that recent years have seen a rapid adoption of IoT home devices, often equipped with cameras and microphones in order to carry out their functions. The illustrative embodiments also recognize and take into account that the recent rapid shift from office work to working at home has increased the use of video conferencing, often in the presence of IoT devices.

The illustrative embodiments also recognize and take into account that, in parallel to the rapid adaption of IoT devices in office and home environments, there have been increasing attacks by malicious hackers targeting IoT devices to gain control of the devices or snoop information the devices collect. The illustrative embodiments also recognize and take into account that many of these IoT devices are always recording in the background, even when a confidential video/audio conference is occurring, resulting in the potential risk of leaking confidential information.

The illustrative embodiments provide a system that automatically detects when a confidential conference is occurring and temporarily disables all IoT devices in the area until the conference is finished. The illustrative embodiments provide an automated defense that protects confidential video and audio conferences against prying IoT devices. The illustrative embodiments do not require adaptations or collaboration from the IoT device manufacturers and can be applied to any device.

As used herein, a "number of," when used with reference to objects, means one or more objects. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, a "computer instruction," or "computer program", means one step or a set of steps that includes information on how to operate, perform, or maintain particular computer software or hardware. For example, a "computer instruction" can be a computer program instruction in the form of lines of code or source code that are executable by a computer system.

One example of an IoT confidentially breach is a conference call during which one of the words spoken by the participants inadvertently activates a voice activated IoT device that begins recording and sends audio snippets to a backend server related to the service of the IoT device in question. Such inadvertent activation may be caused by a "wake up word" being spoken in the natural course of the conversation. A wake up word is a preprogrammed word or phrase that requests the attention of the smart device. At a later time, a quality control team at the IoT device/service company may examine the stored audio snippet during a routine, random quality control review and thereby gain access to the confidential information contained in the audio snippet.

Another example of an IoT confidentially breach is a user forgetting to update the firmware of an IoT device, allowing a hacker to take control of the device. When the user holds a video/audio conference, the hacker can deliberately eavesdrop and monitor the conversation through the IoT device.

The illustrative embodiments use as input a list of devices connected to a local area network including, for example, computers, smart phones, tablet computers, and any other device capable of video and audio conferencing, as well as IoT and other smart devices capable of listening to audio and recording. The illustrative embodiments also detect signals that indicate a video and/or audio conference has begun. These signals may be received directly from audio/video conference software or inferred from intercepted network traffic generated by conferencing devices.

The illustrative embodiments may employ multiple methods to inhibit the ability of IoT devices to listen to and pry into confidential conversations. Examples of disabling potentially eavesdropping IoT devices include disabling/enabling firewall rules that block all traffic generated by and destined to the potentially prying IoT devices, deactivating smart plugs to which prying devices are connected in order to power off the devices, and informing the user that a device should be manually disabled via its mute or power off button.

Figure 2:
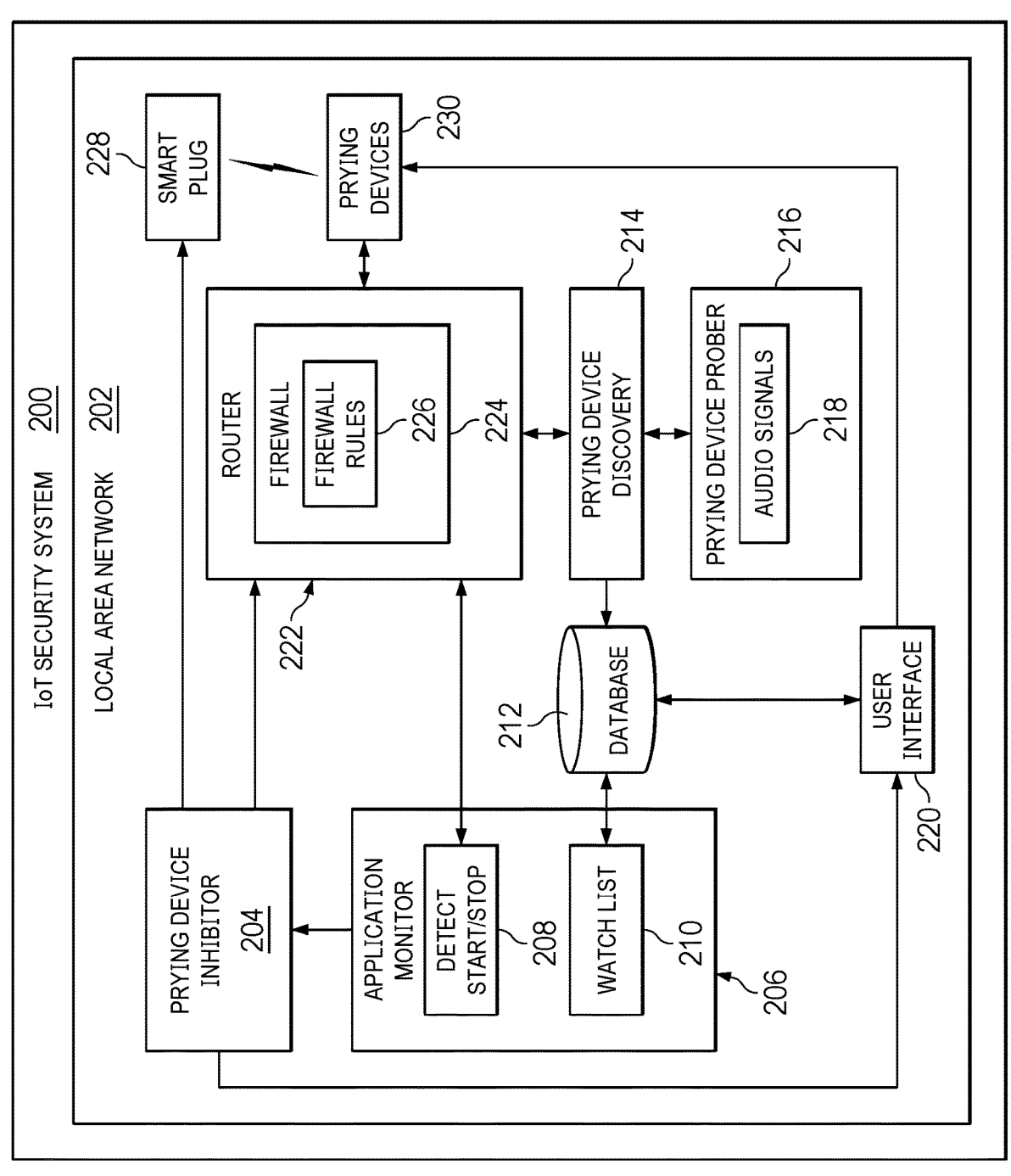
FIG. 2 depicts a block diagram illustrating an IoT security system in accordance with an illustrative embodiment.

FIG. 2 depicts a block diagram illustrating an IoT security system in accordance with an illustrative embodiment. IoT security system 200 may be implemented in computing environment 100 shown in FIG. 1.

One or more prying devices 230 with a microphone and/or camera may be connected to a local area network (LAN) 202. Examples of such devices include voice activated "always on" devices that respond to user requests for information, music playback, online ordering, etc. These devices are capable of recording audio and/or video.

Prying device discovery 214 discovers the presence of one or more prying devices 230 on LAN 202 against which a user should defend and maintains a list of such devices in database 212. Prying device discovery 214 may discover prying devices 230 by scanning all available devices connected to LAN 202. Prying device discovery 214 can be implemented as a software application or hardware device that regularly scans the whole network space of LAN 202 via router 222 (e.g., 192.168.x.x.) in search of devices with specific characteristics (e.g., MAC (media access control) address manufacturer, services and relative service banner listening on specific ports, web management interface signature, etc.). Prying device discovery 214 may also be implemented in an application that communicates with the firewall 224 or router 222 and retrieves the list of all devices that were assigned an IP addresses in the network space of LAN 202 (e.g., hostnames or MAC addresses of the DHCP (dynamic host configuration protocol) lease).

Prying device discovery 214 may also be implemented via user interface 220 through which an administrator maintains a list of devices against which LAN 202 should be defended. User interface 220 may be implemented in a software application or web application that the administrator can use to maintain the list of devices. This list of devices comprises watch list 210, which may be stored in database 212 and loaded into memory by application monitor 206.

Optionally, device discover 214 may also instruct a prying device prober 216 to generate audio signals 218 that are imperceptible to humans but can be captured and transmitted by prying devices 230. With the help of firewall 224, it is possible to observe if any device on LAN 202 generates network traffic that statistically resembles the generated audio signals 218, thereby identifying potentially prying devices 230 that are undetectable by prior detection methods.

Detect start/stop 208 in application monitor 206 detects when a confidential audio and/or video conference begins. Application monitor 206 may automatically discover such conferences by inspecting internet traffic transmitted over LAN 202, looking for traffic streams that resemble audio and video streams. Such inspection can be implemented as a feature of router 222 or firewall 224 or as an IDS (intrusion detection system) software module or plugin installed on the router 222 or firewall 224 or as a hardware device.

Alternatively, application monitor 206 may be implemented as a software application or daemon that monitors all processes being executed on the user's local computer or mobile device and scan for installed video/audio conference software that is executing. Detect start/stop 208 in application monitor 206 may also be automatically triggered by the audio/video conference software via an API (application programming interface) or other integration mechanism.

Application monitor 206 may also be implemented as a stand alone software application that entails an interface such as user interface 220 or a button manually activated by a user when a conference starts.

Prying device inhibitor 204 is informed by application monitor 206 when an audio or video conference begins. Prying device inhibitor 204 then inhibits prying devices 230 identified by prying device discovery 214 in watch list 210. Prying device inhibitor 204 may inhibit prying devices 230 through a number of mechanisms. For example, prying device inhibitor 204 may deactivate a smart plug 228 where a prying device is connected thereby cutting the prying device's power. Such smart plug deactivation may be implemented via an API or similar integration mechanism. Alternatively, the prying device inhibitor 204 may insert a new rule into firewall rules 226 that prevents all traffic generated by or received for an identified prying device 230. Such a change in firewall rules 226 may be implemented using firewall 224 or router 222 with internal remote SSH (secure shell) protocol access or an API or other integration mechanism. The prying device inhibitor 204 may also alert the user to manually disable the identified prying devices 230 via mute button or power off when the conference begins. This alert option may be implemented as a software application or hardware device that display such a notification to the user, such as through user interface 220 or a mobile device.

When the audio/video conference ends, application monitor 206 informs the prying device inhibitor 204 and/or user. Prying device inhibitor 204 can reactive the prying devices 230 by reactivating the smart plug 228 to restore power, changing the firewall rules 226 to allow network track to and from the prying devices 230, and/or inform the user to manually reactive the prying devices 230.

Figure 3:
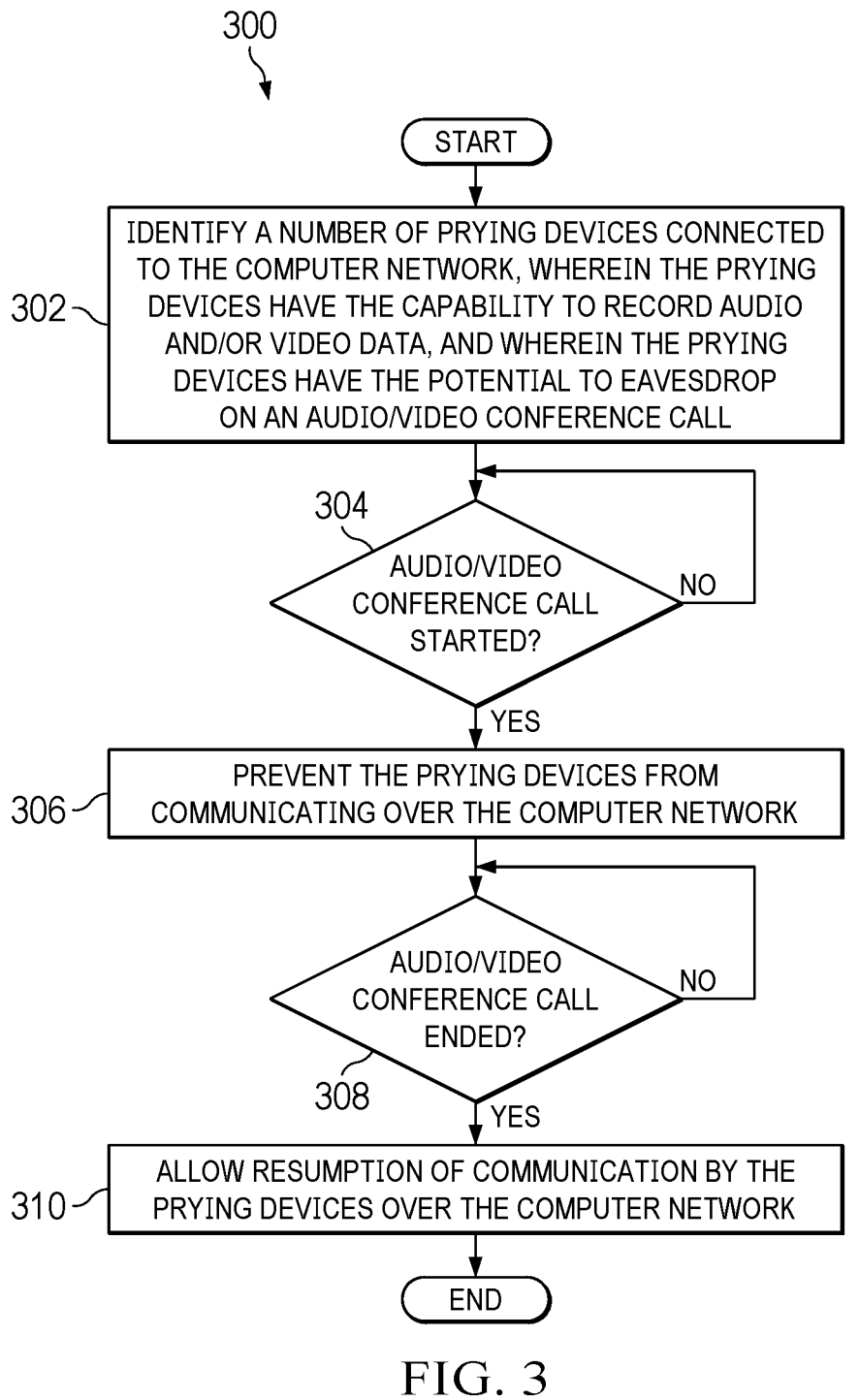
FIG. 3 depicts a flowchart of a process for protecting against prying devices on a computer network in accordance with an illustrative embodiment.

FIG. 3 depicts a flowchart of a process for protecting against prying devices on a computer network in accordance with an illustrative embodiment. Process 300 can be in computing environment 100 in FIG. 1 and in IoT security system 200 in FIG. 2.

Process 300 begins by identifying a number of prying devices connected to the computer network, wherein the prying devices have the capability to record audio and/or video data, and wherein the prying devices have the potential to eavesdrop on an audio/video conference call (step 302). Detecting the prying devices may comprise scanning the computer network via a router for devices with specified characteristics or retrieving from a router or firewall a list of devices assigned an IP address in the computer network. (See also FIG. 4 below).

Process 300 continually monitors for the initiation of an audio/video conference call (step 304). Responsive to detecting initiation of the audio/video conference call, process 300 prevents the prying devices from communicating over the computer network (step 306). Preventing the prying devices from communicating over the computer network may comprises deactivating one or more smart plugs that provide power to the prying devices. Alternatively, preventing the prying devices from communicating over the computer network may comprise changing firewall rules in a firewall to prevent communication from and to the prying devices over the computer network.

Process 300 continually monitors for termination of the audio/video conference call (step 308). Detecting initiation and termination of the audio/video conference call may comprise monitoring the computer network for traffic streams that resemble audio/video streams, scanning a local computer on the computer network for executing audio/video conference software, or receiving an automatic API call from the audio/video conference software.

Responsive to detecting termination of the audio/video conference call, process 300 allows resumption of communication by the prying devices over the computer network (step 310). Process 300 then ends.

Figure 4:
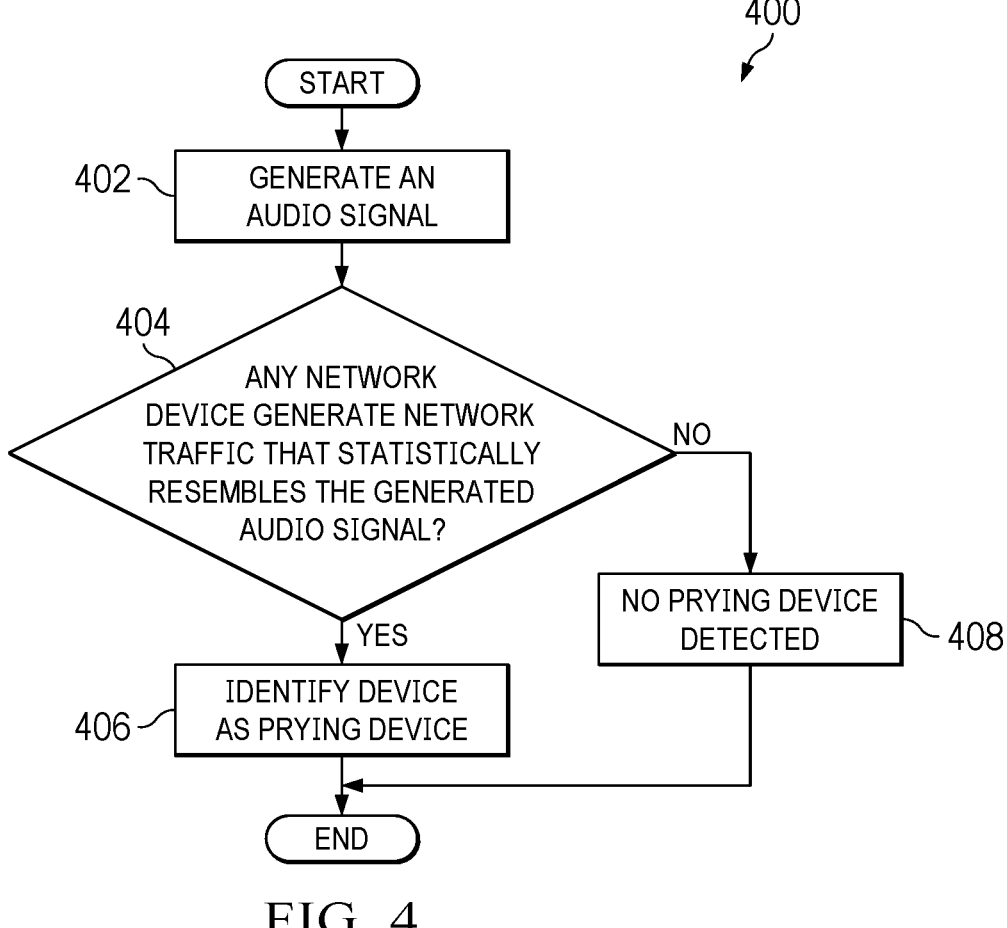
FIG. 4 depicts a flowchart of a process for identifying prying devices on a computer network in accordance with an illustrative embodiment.

FIG. 4 depicts a flowchart of a process for identifying prying devices on a computer network in accordance with an illustrative embodiment. Process 400 is an example implementation of step 302 in FIG. 3.

Process 400 begins by generating an audio signal (step 402). This generated audio signal may be imperceptible to human. Process 400 then monitors traffic on the computer network to determine if any devices on the computer network generate network traffic that statistically resembles the generated audio signal (step 404). This monitoring may be via a firewall for the network. If any device does generate network traffic that statistically resembles the generated audio signal, the device is identified as a prying device (step 406).

If no device generates network traffic that statistically resembles the generated audio signal, no prying device is detected (step 408). Process 400 then ends.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method for protecting against prying devices on a computer network, the method comprising:
using a number of processors to perform the steps of:
identifying a number of prying devices connected to the computer network, wherein the prying devices have the capability to record audio and/or video data, and wherein the prying devices have the potential to eavesdrop on an audio/video conference call;
detecting initiation of the audio/video conference call;

responsive to detecting initiation of the audio/video conference call, preventing the prying devices from communicating over the computer network;

detecting termination of the audio/video conference call; and responsive to detecting termination of the audio/video conference call, allowing resumption of communication by the prying devices over the computer network.

2. The method of claim 1, wherein identifying the prying devices comprises scanning the computer network via a router for devices with specified characteristics.

3. The method of claim 1, wherein identifying the prying devices comprises retrieving, from a router or firewall, a list of devices assigned an IP address in the computer network.

4. The method of claim 1, wherein identifying the prying devices comprises:

generating an audio signal; and determining if any device connected to the computer network generates network traffic that statistically resembles the generated audio signal.

5. The method of claim 1, wherein detecting initiation and termination of the audio/video conference call comprises at least one of:

monitoring the computer network for traffic streams that resemble audio/video streams;

scanning a local computer on the computer network for executing audio/video conference software; or an automatic API call from the audio/video conference software.

6. The method of claim 1, wherein preventing the prying devices from communicating over the computer network comprises deactivating one or more smart plugs that provide power to the prying devices.

7. The method of claim 1, wherein preventing the prying devices from communicating over the computer network comprises changing firewall rules in a firewall to prevent communication from and to the prying devices over the computer network.

8. A system for protecting against prying devices on a computer network, the system comprising:

a storage device that stores program instructions; and one or more processors operably connected to the storage device and configured to execute the program instructions to cause the system to:

identify a number of prying devices connected to the computer network, wherein the prying devices have the capability to record audio and/or video data, and wherein the prying devices have the potential to eavesdrop on an audio/video conference call;

detect initiation of the audio/video conference call;

responsive to detecting initiation of the audio/video conference call, prevent the prying devices from communicating over the computer network;

detect termination of the audio/video conference call; and responsive to detecting termination of the audio/video conference call, allow resumption of communication by the prying devices over the computer network.

9. The system of claim 8, wherein identifying the prying devices comprises scanning the computer network via a router for devices with specified characteristics.

10. The system of claim 8, wherein identifying the prying devices comprises retrieving, from a router or firewall, a list of devices assigned an IP address in the computer network.

11. The system of claim 8, wherein identifying the prying devices comprises:

generating an audio signal; and determining if any device connected to the computer network generates network traffic that statistically resembles the generated audio signal.

12. The system of claim 8, wherein detecting initiation and termination of the audio/video conference call comprises at least one of:

monitoring the computer network for traffic streams that resemble audio/video streams;

scanning a local computer on the computer network for executing audio/video conference software; or an automatic API call from the audio/video conference software.

13. The system of claim 8, wherein preventing the prying devices from communicating over the computer network comprises deactivating one or more smart plugs that provide power to the prying devices.

14. The system of claim 8, wherein preventing the prying devices from communicating over the computer network comprises changing firewall rules in a firewall to prevent communication from and to the prying devices over the computer network.

15. A computer program product for protecting against prying devices on a computer network, the computer program product comprising:

a persistent storage medium having program instructions embodied thereon to perform the steps of:

identifying a number of prying devices connected to the computer network, wherein the prying devices have the capability to record audio and/or video data, and wherein the prying devices have the potential to eavesdrop on an audio/video conference call;

detecting initiation of the audio/video conference call;

responsive to detecting initiation of the audio/video conference call, preventing the prying devices from communicating over the computer network;

detecting termination of the audio/video conference call; and responsive to detecting termination of the audio/video conference call, allowing resumption of communication by the prying devices over the computer network.

16. The computer program product of claim 15, wherein identifying the prying devices comprises scanning the computer network via a router for devices with specified characteristics.

17. The computer program product of claim 15, wherein identifying the prying devices comprises retrieving, from a router or firewall, a list of devices assigned an IP address in the computer network.

18. The computer program product of claim 15, wherein identifying the prying devices comprises:

generating an audio signal; and determining if any device connected to the computer network generates network traffic that statistically resembles the generated audio signal.

19. The computer program product of claim 15, wherein detecting initiation and termination of the audio/video conference call comprises at least one of:

monitoring the computer network for traffic streams that resemble audio/video streams;

scanning a local computer on the computer network for executing audio/video conference software; or an automatic API call from the audio/video conference software.

20. The computer program product of claim 15, wherein preventing the prying devices from communicating over the computer network comprises at least one of:

deactivating one or more smart plugs that provide power to the prying devices; or changing firewall rules in a firewall to prevent communication from and to the prying devices over the computer network.

* * * * *